April 18, 1933. A. P. GIULIANO 1,904,826
MEANS FOR DETECTING METALLIC OBJECTS IN HIDES AND SKINS
Filed May 22, 1930
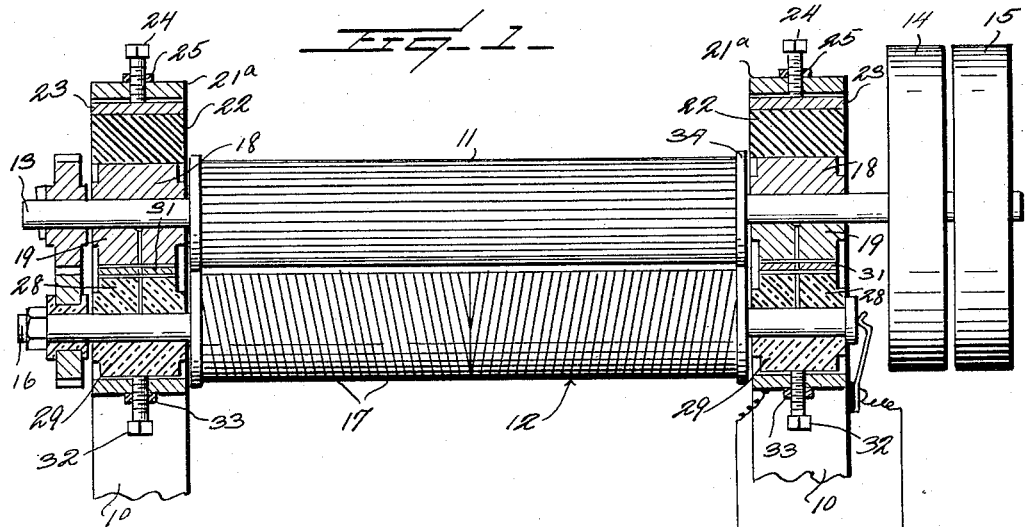
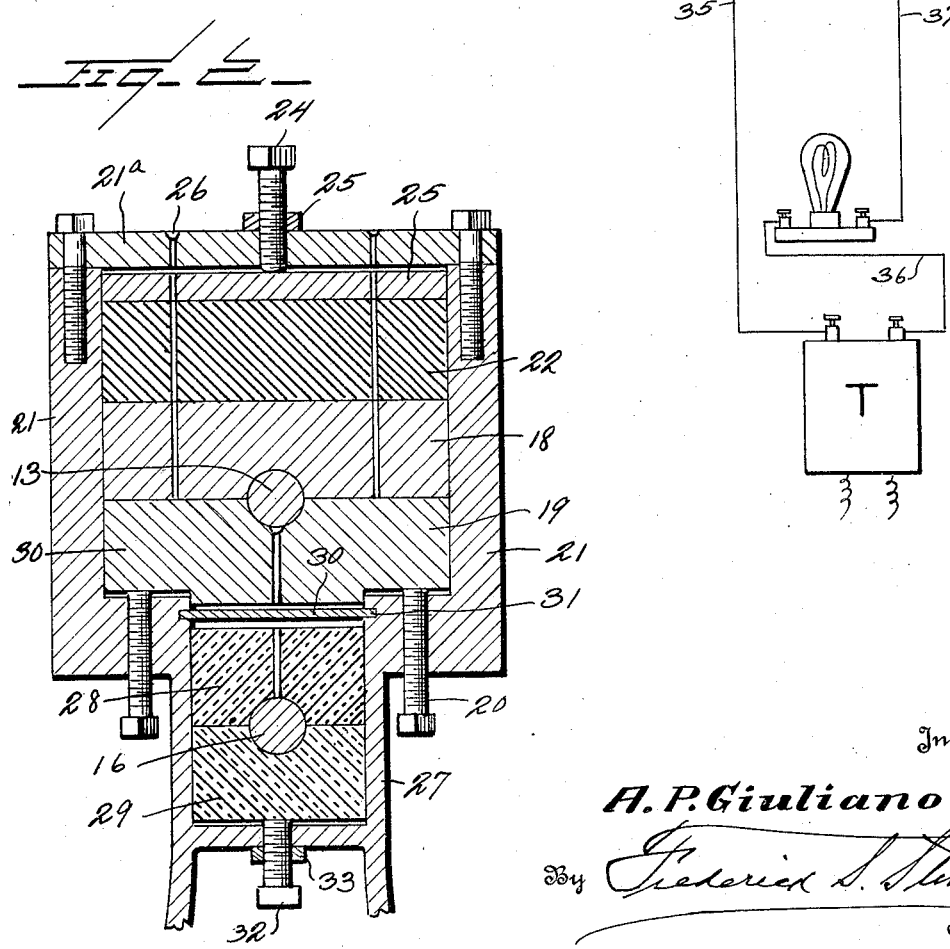
Inventor
A. P. Giuliano
By Frederick S. Still
Attorney Patented Apr. 18, 1933

1,904,826

UNITED STATES PATENT OFFICE

ANTHONY PHILIP GIULIANO, OF NEWARK, NEW JERSEY

MEANS FOR DETECTING METALLIC OBJECTS IN HIDES AND SKINS

Application filed May 22, 1930. Serial No. 454,758.

This invention relates to means for detecting metal such as nails, iron, copper, tacks, bullets, screws, etc., which are found in animal hides and particularly in rabbit skins and other furs.

The general object of my invention is to provide a machine which will act to detect these metallic objects in the skins as the skins or hides are passed through them and which will energize a signal, enabling the workman to remove the metallic object.

A further object is to provide a construction of this character which will move outward any metal object which, if present at all, is usually present at the margin of the hide or skin, but which will also act to move said metal object even if found in the middle portion of the skin or hide to a position where it will engage the upper and lower metallic rollers of the machine and cause a circuit to be completed through a signal.

A further object is to provide a construction of this character in which two opposed metallic rollers are used, the bearings of which are insulated from each other, the rollers being connected in circuit with a signal and spaced apart a distance such that only when a metallic object is disposed between the rollers and contacts therewith will the signal be energized.

A further object is to provide improved bearings for rollers of this character which will permit the adjustment of the rollers relatively toward or from each other, but which will prevent the rollers from coming in electrical contact with each other.

Other objects will appear in the course of the following description.

My invention is illustrated in the accompanying drawing, wherein:—

Figure 1 is a front elevation of a machine of the character described, the bearings being in section;

Figure 2 is an enlarged section on the line 2—2 of Figure 1.

Referring to this drawing, 10 designates a metallic supporting frame of any suitable character providing bearings for the metallic rollers 11 and 12. The upper roller is shown as having a shaft 13 upon which it is mounted, this shaft carrying the fast and loose driving pulleys 14 and 15. Any other suitable means for driving the rollers may be used, however. The lower roller 12 is provided with a shaft 16.

The upper roller 11 is preferably longitudinally fluted while the lower roller is formed with spirally or helically cut grooves or threads 17 extending in opposite directions from the middle of the roller. The shafts of the rollers are supported in bearings constructed as follows. The upper shaft 13 is mounted within the upper and lower bushings 18 and 19 which may be made of Babbitt metal or any other suitable material, the lower bushing 19 resting upon and being supported by the vertically extending adjusting screws 20 which extend up through the bearing box 21. Above the upper bushing 18, there is disposed a rubber or other elastic block 22 and resting upon the top of this block is a metallic plate 23. Extending down through the upper plate 21a of the box 21 is an adjusting screw 24 having a lock nut 25. Thus any desired pressure may be brought upon the rubber cushion 22. This rubber cushion permits the upper roller 11 to raise slightly in case of necessity. Oil ducts 26 are provided to conduct oil to the bearings. The bearing box 21 is extended downward at its middle as at 27 to accommodate therein the upper and lower bearing bushings 28 and 29 respectively which are of insulating material and which support the shaft 16.

Between the upper bearing bushing for the shaft 16 and the lower bearing bushing 19 for the shaft 13 there is disposed a metallic plate 30 having its margins disposed in grooves 31 formed in the sides of the box 21. An adjusting screw 32 extends upward through the boxing 27 and engages the lower bearing member 29 so that this bearing member may be adjusted upward or downward and this screw is held in adjusted position by means of the nut 33.

Preferably, non-conducting collars 34 will be disposed around the upper and lower rollers at the ends thereof which will always prevent the rollers from coming in contact with each other, even if the bearings have become worn.

Grounded to the frame 10 in any suitable manner is a wire or other conductor 35 which leads to a transformer T which in turn is connected in any suitable manner to a source of current. From this transformer also leads the conductor 36 which extends to a signal S of any suitable character, such, for instance, as a lamp. It will be understood, however, that this may be a visual signal, an audible signal or any other suitable signal. From this lamp extends the conductor 37 which contacts by a slip ring or any other suitable means to the shaft 16 of the lower roller. Inasmuch as the upper roller is not insulated from the frame of the machine, it will be obvious that when a metallic object passes between these rollers and contacts with both of these rollers, a circuit will be completed to the signal and the signal will be energized.

The reversely pitched spiral grooves or threads of the lower roller 12 are particularly important as these serve to pull out and detach either partially or wholly any metal object which may be in the hide or skin, thereby insuring contact of both rollers with the metal object. This roller, when revolving, works from the middle in opposite directions so that it moves the metal which is usually found in the margin of the hide, but which may also be in the center of the hide outwardly, thereby causing it to contact with the upper and lower rollers and closing the circuit which operates the electrical signal.

It will be understood that the upper roller which is longitudinally fluted grips the hide and forces it through between the rollers, these rollers being power driven rollers. While the hide is being forced through the rollers, the spiral grooves of roller 12 move obliquely relatively to the hide over the surface thereof, drawing any foreign object that may cling to the hide laterally. If the bullet be between the hide (that is, sandwiched in the hide), the spiral grooves passing obliquely over the surface of the hide and over the bullet draw the hide from around the bullet, causing the hide to be punctured on opposite faces so that it may well come in metallic contact with the rollers. It will be understood that where the bullet is disposed a high spot is created which is non-yielding but the hide will yield at this point and the lateral drawing action of the spiral roller, while not great enough to actually stretch the hide, tends to pull the upper and lower surfaces of the hide laterally so that the upper and lower surfaces are pulled off of the bullet, laying it bare. If the bullet should become detached, it will be carried laterally by the spiral grooves and either form a contact between the two rollers or drop off upon the floor. The lateral movement whereby the bullet punctures the hide cannot be obtained with smooth rollers nor by pressure between the rollers, nor can this action be obtained by a smooth roller acting in conjunction with the reversely spiraled roller because the smooth roller will not grip the hide and hold it while the lateral pull takes place. If smooth rollers were used entirely, the hide would not go through the rollers without great difficulty as the rollers would slip and not grip the hide. If both rollers were merely longitudinally fluted, the hides would not be punctured as in this case there is only one directional force applied to the hide and that is inward, but by providing the combination of a longitudinally fluted roller with a spirally fluted or threaded roller, the hide is fed positively between the rollers while at the same time the upper and lower surfaces of the hide are stretched relative to each other which causes either the disengagement of a foreign body or the puncturing of the hide. In either case a signal is sounded.

By turning the screw 24 in one direction or the other and adjusting the screws 20, the rollers may be brought nearer to or further from each other, but the rollers can never come in contact with each other because of the insulating collars 34. The rubber cushion 22 permits the upper roller to move up a very slight fraction to allow the hide to pass through. The plate 30 disposed in grooves 31 is so placed that when the parts 28, 29 and 16 are put in position, the adjusting screw 32 may be used to level the lower roller and lift the parts 28 and 29 and the shaft 16 upward toward or against the plate 31 and thus hold the lower roller in true position.

The lower roller tends to remove bullets and other foreign metallic objects from the hides. These are generally found in the center, but also may be found at the margins of the hide. Nails and other metallic objects are mostly found at the edges of the hide. These objects in some instances are completely removed from the hide for the lower roller tends to pull them out and even if the metal is not completely detached from the hide it hangs on to the edges and may be easily detached with the fingers.

While I have illustrated the upper roller as being fluted, I do not wish to be limited to this though this is preferable. This detector may form part of a brushing machine whereby the skins are brushed and the fur cleaned and placed in proper condition.

I claim:—

1. Means for detecting the presence of metallic objects in hides including two parallel metallic rollers connected in a normally open signal circuit and spaced from each other to permit the passage of the hide between them, one of said rollers being longitudinally fluted, the other roller having reversely pitched spiral threads extending in opposite directions from the middle of the roller whereby to cause the hide to be laterally stretched as it passes between the rollers and cause the emergence of the object through the faces of the hide and permit the object to come in contact with the upper and lower rollers.

2. In a machine of the character described, a supporting frame having bearing boxes at opposite ends, a pair of lower bearing bushings of insulating material disposed in the lower end of each bearing box, means for limiting the upward movement of said bearing bushings, a screw for raising said bushings, an upper pair of bearing bushings disposed in each box, screws extending upward in each box and supporting said bushings, a resilient cushon disposed above the last named bushings, an adjusting screw extending through the top of each box and operatively bearing against said cushions, upper and lower metallic rollers connected in a normally open signalling circuit and having their shafts disposed through the respective bushings, and means preventing the rollers having metallic contact with each other, one of said rollers being longitudinally fluted, the other of said rollers having reversely pitched spiral threads extending in opposite directions from the middle of the roller, the threads on the last named roller acting to stretch the hide laterally as it passes between the rollers and permit the object to puncture the hide and come in engagement with the upper and lower rollers.

In testimony whereof I affix my signature.

ANTHONY P. GIULIANO.